United States Patent [19]
Yoda et al.

[11] 3,716,519
[45] Feb. 13, 1973

[54] METHOD FOR PRODUCING A POLYAMIDEIMIDE AND PRODUCT OF SAID METHOD

[75] Inventors: Naoya Yoda; Masaru Kurihara, both of Otsu; Noriaki Dokoshi, Kusatsu; Chiaki Tanaka; Masaomi Eguchi, both of Otsu, all of Japan

[73] Assignee: Toray Industries, Inc., Tokyo, Japan

[22] Filed: Aug. 7, 1970

[21] Appl. No.: 61,914

[30] Foreign Application Priority Data

Aug. 11, 1969 Japan..................................44/62868
Sept. 24, 1969 Japan..................................44/75261

[52] U.S. Cl...........260/47 CB, 260/30.2, 260/30.6 R, 260/30.8 R, 260/32.2, 260/32.4, 260/32.6 N, 260/63 N, 260/65, 260/77.5 R, 260/78 TF
[51] Int. Cl...............................................C08g 20/32
[58] Field of Search....260/47 CP, 78 TF, 65, 77.5 R, 260/47 CB, 63 N

[56] References Cited

UNITED STATES PATENTS

| 3,435,002 | 3/1969 | Holub | 260/46.5 |
| 3,518,230 | 6/1970 | Sheffer et al. | 260/65 |
| 3,546,152 | 12/1970 | Bolton | 260/29.2 |

*Primary Examiner*—William H. Short
*Assistant Examiner*—L. L. Lee
*Attorney*—Paul & Paul

[57] ABSTRACT

Polyamideimides are prepared by reacting a bis (tricarboxylic acid anhydride) anhydride with a primary diamine or an aminocarboxylic acid, and polymerizing the resulting oligomer composition with a diisocyanate.

6 Claims, No Drawings

METHOD FOR PRODUCING A POLYAMIDEIMIDE AND PRODUCT OF SAID METHOD

BACKGROUND OF THE INVENTION

1. Field of the Invention

The present invention relates to a method for producing a polyamideimide, and more particularly relates to a method for producing a polyamideimide having excellent heat resistance and mechanical properties, wherein bis (tricarboxylic acid anhydride) anhydride is the major acid component.

2. Description of the Prior Art

Generally speaking, polyamideimides can be obtained by reacting a tricarboxylic acid halide anhydride and a diamine, or reacting a tricarboxylic acid anhydride and a diisocyanate. As is well known to those skilled in the art, a tricarboxylic acid halide anhydride is easily hydrolyzed by humidity in the air. Since it has a high boiling point, it is necessary in the purification of tricarboxylic acid halide anhydride to carry out distillation or recrystallization while preventing thermal decomposition under reduced pressure. Therefore there is a serious cost problem in production, in the handling of raw materials of high purity.

On the other hand hydrogen halide is produced in the reaction of diamines, and the deterioration of physical properties of the polymer and the corrosion of reaction vessels attributable to the generation of hydrogen halide cannot be avoided. This is also an important drawback.

Polyamideimides can be obtained from tricarboxylic acid anhydrides and diamines, but in this case the reaction is carried out very slowly, and it is practically impossible to produce a polymer of high molecular weight in accordance with conventional methods.

We have carried out researches concerning raw materials for producing polyamideimides and methods for producing the same, with a view to producing a polyamideimide having sharply improved physical properties and overcoming the disadvantages of the above mentioned conventional methods for producing polyamideimides. As a result it was discovered that polyamideimides having excellent properties can be produced easily by using a specific diacid anhydride as the major acid component.

SUMMARY OF THE INVENTION

The present invention relates to a method for producing polyamideimide comprising reacting (A) a bis (tricarboxylic acid anhydride) anhydride represented by the structural formula

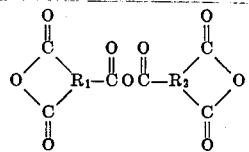

[I]

wherein $R_1$ and $R_2$ are trivalent organic radicals having from three to 25 carbon atoms, and two of the three carbonyl radicals to $R_1$ and $R_2$ are bonded to the neighboring positions and (B) a compound selected from the group consisting of a primary diamine represented by the structural formual $$NH_2 - R_3 - NH_2 \quad \text{...[II]}$$

and an aminocarboxylic acid represented by the structural formula $$NH_2 - R_4 - COOH \quad \text{...[III]}$$

where $R_3$ and $R_4$ represents a divalent organic radical having from two to 30 carbon atoms, to prepare an amideimide oligomer composition wherein the terminal radicals are carboxyl radicals or cyclic acid anhydride radicals, or more preferably more than 33 percent thereof is a carboxyl radical, and reacting the oligomer composition thus obtained with at least one diisocyanate represented by the structural formula $$OCN - R_5 - NCO \quad \text{...[IV]}$$

wherein $R_5$ is a divalent organic radical having from three to 30 carbon atoms.

One of the three carbonyl radicals bonded to $R_1$ and $R_2$ in the bis (tricarboxylic acid anhydride) anhydride represented by the general formula [I] is not restricted to the specified position, but it is preferable that it be bonded on a non-neighboring position.

On the other hand, $R_1$ and $R_2$ are the same or different organic radicals, but it is preferable that $R_1$ and $R_2$ are the same kind of organic radicals, and $R_1$ and $R_2$ are generally aliphatic, aromatic or alicyclic radicals, but more preferably they should be aromatic radicals.

More concretely speaking, $R_1$ and $R_2$ are trivalent aliphatic, alicyclic, or aromatic radicals having from three to 25 carbon atoms represented by the following aliphatic radicals of the formula $$R-\overset{|}{C}H-\overset{|}{C}H-\left(CH_2\right)_n-\overset{|}{C}H-R'$$

wherein R and R' are H or alkyl of one to 20 carbon atoms and $n$ is zero to 10, alicyclic radicals selected from the group consisting of

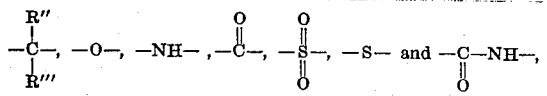

wherein X is a member selected from the group consisting of nil,

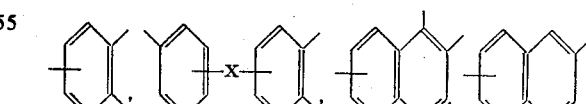

and R'' and R''' are H or alkyl of one to 10 carbon atoms, aromatic radicals selected from the group consisting of

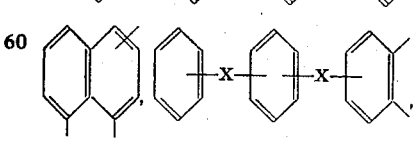

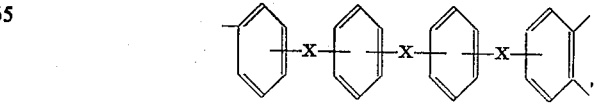

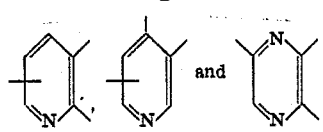 and 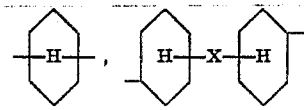

The following are typical, workable examples of such bis (tricarboxylic acid anhydride) anhydrides as referred to above.

bis (trimellitic acid anhydride) anhydride
bis (2, 3, 6-naphthalene tricarboxylic acid anhydride) anhydride
bis (2, 2', 3-biphenylcarboxylic acid anhydride) anhydride
bis [2-(3, 4-dicarboxyphenyl)-2-(3-carboxyphenyl) propane anhydride] anhydrice
bis (1, 2, 4-naphthalene tricarboxylic acid anhydride) anhydride
bis (2, 3, 5-pyrazine tricarboxylic acid anhydride) anhydride
bis [2-(2, 3-dicarboxyphenyl)-2-(3-carboxyphenyl) propane anhydride] anhydride
bis [1-(2, 3-dicarboxyphenyl)-1-(3-carboxyphenyl) ethane anhydride] anhydride
bis [1-(3, 4-dicarboxyphenyl)-1-(4-carboxyphenyl) ethane anhydride] anhydride
bis [(2, 3-dicarboxyphenyl) (2-carboxyphenyl) methane anhydride] anhydride
bis (1, 2, 3-benzene tricarboxylic acid anhydride) anhydride
bis (3, 3', 4-tricarboxylbenzophenone anhydride) anhydride The bis (tricarboxylic acid anhydride) anhydrides listed above can be used independently or in the form of a mixture.

The bis (tricarboxylic acid anhydride) anhydrides listed above can be produced easily from tricarboxylic acid anhydrides in accordance with conventional methods. Specifically, they can be prepared by heating 2 mols of tricarboxylic acid anhydride along with glacial acetic acid or cloracetic acid or similar dehydrating agents.

The foregoing reaction is carried out quantitatively, and therefore the reaction mixture can be subjected directly to the reaction of the present invention.

On the other hand, the bis (tricarboxylic acid anhydride) anhydrides can be prepared easily by carrying out the removal of hydrogen halide between a tricarboxylic acid anhydride and a tricarboxylic acid halide.

The primary diamine is represented by the formula [II] given below:

$$H_2N - R_3 - NH_2 \quad ...[II]$$

wherein $R_3$ is a divalent aliphatic, alicyclic, or aromatic radical having from two to 30 carbon atoms, in case of $R_3$ being aromatic or alicyclic two amino radicals are preferably not bonded to the neighboring positions. $R_3$ is particularly represented by the divalent aliphatic, alicyclic, or aromatic radicals represented below:

Aliphatic radicals

wherein $n$ is two to 15, preferably two to 10 in most cases, and one to five of hydrogen atoms in $(CH_2)_n$ may be substituted by an alkyl group having one to 10 carbon atoms, or by an alkoxy group having one to 10 carbon atoms or chlorine.

Alicyclic radicals selected from the group consisting of

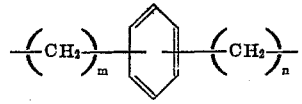

wherein X is the same as $R_1$ and $R_2$.

Aromatic radicals selected from the group consisting of

(where $m$ and $n$ are 0 or 1),

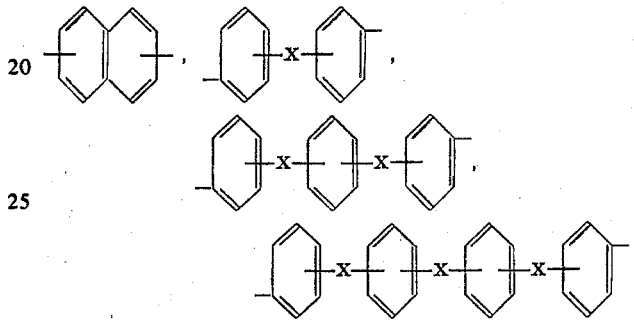

where X is the same as $R_1$ and $R_2$, where one to 4 hydrogen atoms in the benzene nucleus or nuclei may be substituted by alkyl $C_1 - C_{10}$, alkoxyl of $C_1 - C_{10}$ and halogen.

The following specific compounds are included within the scope of this invention:

aliphatic or linear diamine such as
  ethylene diamine, trimethylene diamine,
  tetramethylene diamine,
  pentamethylene diamine,
  hexamethylene diamine,
  heptamethylene diamine,
  octamethylene diamine,
  nonamethylene diamine,
  decamethylene diamine, etc., aromatic diamines such as
  p-xylylene diamine,
  m-phenylene diamine,
  p-phenylene diamine,
  benzidine,
  4,4'-diaminodiphenylpropane,
  4,4'-diamino diphenyl methane,
  3,3'-dimethyl-4,4'-diaminodiphenylmethane,
  3,3'-dichlorobenzine,
  4,4'-diaminodiphenylsulfide,
  3,3'-diaminodiphenylsulfone,
  4,4'-diaminodiphenylsulfone,
  4,4'-diaminodiphenylether,
  1,5-diaminonaphthalene,
  3,3'-dimethyl-4,4'-biphenyldiamine,
  3,3'-dimethoxybenzidine,
  1,4-bis (3-methyl-5-aminophenyl) benzene,
  1-isopropyl-2, 4-methaphenylene diamine, etc.

branched aliphatic diamine such as
  3-methylheptamethylene diamine,
  4,4-dimethylheptamethylene diamine,
  2,4-diaminododecane, etc.

The primary diamines listed above can be used independently or in the form of a mixture of one or more diamines.

Amino carboxylic acids according to this invention are represented by the formula [III]

$$H_2N - R_4 - COOH \quad \text{...[III]}$$

wherein $R_4$ is a divalent radical having from three to 30 carbon atoms, and the amino radical and the carboxyl radical are bonded to separate carbon atoms, and it is preferable that the amino radical and the carboxyl radical should not be bonded on neighboring positions, and includes the compounds represented by the formula $$HOOC - (CH_2)_n - NH_2$$

where $n$ is a positive integer and is usually less than 10. $R_4$ may consist of any of the aliphatic, alicyclic and aromatic radicals, the same as heretofore described with respect to $R_3$ and the diamines. More preferable compounds are as follows:

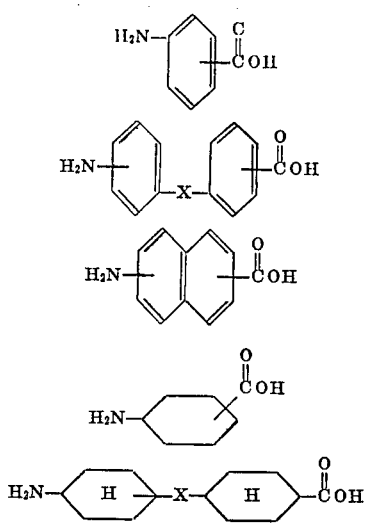

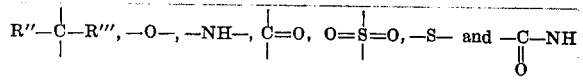

wherein X is selected from the group consisting of a carbon-to-carbon bond, alkylene, $$R''-\overset{|}{\underset{|}{C}}-R''', -O-, -NH-, \overset{|}{\underset{|}{C}}=O, O=\overset{|}{\underset{|}{S}}=O, -S- \text{ and } -\overset{}{\underset{\overset{\|}{O}}{C}}-NH$$

In respect to amino compounds such as $H_2N-R_3-NH_2$ and $H_2N-R_4-COOH$, when the amino compound is used within the range of at least 5 mole percent of $H_2N-R_3-NH_2$ and correspondingly at most 95 mol percent of $H_2N-R_4-COOH$ preferred result may be obtained.

In diisocyanates represented by the general formula [IV] of $OCN-R_5-NCO$, $R_5$ is a divalent organic radical having from 3 to 30 carbon atoms. In most cases $R_5$ is an aliphatic, alicyclic, aromatic radical, but preferably it is an aromatic radical.

It is preferable that two isocyanate radicals should not be bonded to neighboring carbon atoms when $R_5$ is an alicyclic or aromatic radical.

More concretely speaking, $R_5$ is a divalent aliphatic, alicyclic, or aromatic radical having three to 30 carbon atoms, and may be any radical heretofore described in connection with the diamines and $R_3$. However $R_5$ may be selected from the group consisting of:
Aliphatic radicals

wherein $n$ is three to 15, preferably three to 10 in most cases, and one to 10 of hydrogen atoms in $-(CH_2)_n$ may be substituted by an alkyl group having one to 10 carbon atoms, or by an alkoxy group having one to 10 carbon atoms or chlorine.

Alicyclic radicals selected from the group consisting of

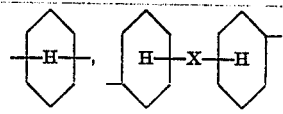

where X is the same as $R_1$ and $R_2$.
Aromatic radicals selected from the group consisting of

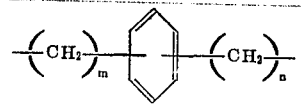

(where $m$ and $n$ are 0 or 1),

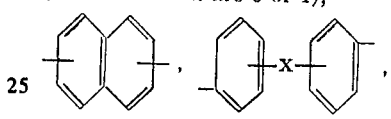

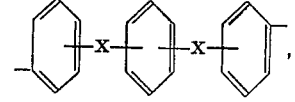

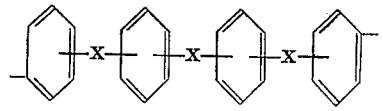

where X is the same as $R_1$ and $R_2$, where one to four hydrogen atoms in the benzene nucleus or nuclei may be substituted by alkyl of $C_1 - C_{10}$, alkoxy of $C_1 - C_{10}$ and halogen.

The above mentioned diisocyanates include:
tetramethylene-(1,4)-diisocyanate,
hexamethylene-(1,6)-diisocyanate,
cyclohexane-(1,4)-diisocyanate,
dicyclohexylmethane-(4,4')-diisocyanate,
phenylene-(1,3)-diisocyanate,
toluylene-(1,4)-diisocyanate,
toluylene-(2,6)-diisocyanate,
toluylene-(2,4)-diisocyanate, and the mixtures thereof,
diphenylmethane-(4,4')-diisocyanate,
diphenylether-(4,4')-diisocyanate,
naphthalene-(1,5)-diisocyanate,
dicyclohexyl-4,4'-diisocyanate,
triphenylmethane-4,4'-diisocyanate,
1-methoxybenzene-2,4-diisocyanate,
$\omega,\omega'$-dipropyletherdiisocyanate,
diphenylsulfide, 4,4-diisocyanate, etc.

Diisocyanates, a part or the whole of the isocyanate radical thereof having been modified with $R_6OH$, can also be subjected to the polymerization reaction. In the formula $R_6OH$, $R_6$ is an alkyl radical of one to 10 carbon atoms, a cycloalkyl radical of three to 10 carbon atoms or an aryl radical of $C_6 - C_{22}$ carbon atoms.

Examples of such derivatives, as mentioned above, include the following:
Aliphatic diamine derivatives such as
N,N'-diethoxycarbonylhexamethylene diamine,
N,N'-diphenoxycarbonyltrimethylene diamine,
N,N'-dicyclohexyloxycarbonyl decamethylene diamine, Aromatic diamine derivatives such as
  N,N'-dimethoxycarbonyl benzidine,
  N,N'-dimethoxycarbonyl diamino diphenylsulfone,
  N,N'-dimethoxycarbonyl-4,4'-diaminodiphenyl-
    methane,
  N,N'-diethoxycarbonyl-1,5-diaminonaphthalene,
    etc.
Alicyclic diamine derivatives such as
  N,N'-diethoxycarbonyl-1,4-cyclohexyldiamine,
  N,N'-diphenoxycarbonylcyclopentane-1,3-diamine,
and compounds represented by the following formulas:

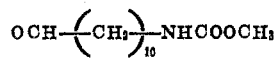

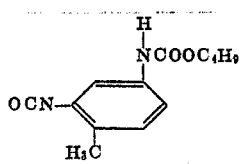

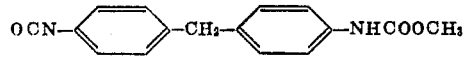

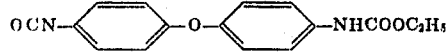

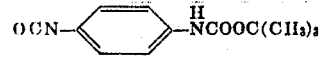

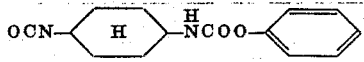

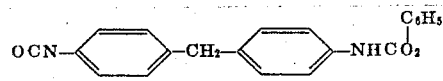

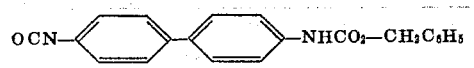

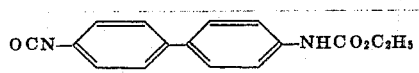

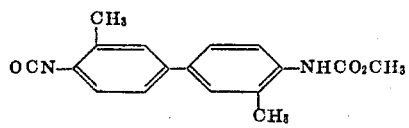

The above given compounds can be used independently or as mixtures of one or more.

In the first stage of the method of the present invention, the reaction between the acid anhydride and the amino radical is brought about.

As is generally known to those skilled in the art, the reaction between an acid anhydride radical and an amino radical can be carried out even at a remarkably low temperature to produce an amino bond and a carboxyl radical.

On the other hand, the amido bond-producing reaction between free carboxyl radicals and amino radicals, and the imido bond-producing reaction by means of self-condensation of amido acid bonds, require a much higher temperature, generally above 150°C.

Therefore, in the present invention, at the primary stage of the reaction, the reaction can be carried out at a room temperature.

Accordingly, the monomer having an amino radical can be added stage-wise to the reaction system.

In regard to the mol ratio of the monomer in the first stage of the reaction, this ratio can be determined in the following manner.

From a stoichiometric point of view, bis (tricarboxylic acid anhydride) anhydride is considered to be trivalent against an amino radical (at a lower reaction temperature, the acid anhydride radical alone is reacted on the amino radical).

Therefore, when a primary diamine alone is used as the monomer containing the amino radical, the molar ratio of acid anhydride and diamine is 2:3, in the equimolar solution.

On the other hand, when an amino carboxylic acid alone is used, the molar ratio of acid anhydride and amino-carboxylic acid is 1:3 in the equimolar solution.

Thus, one of the reactions carried out by using the equimolar monomers may be represented by the following formula:

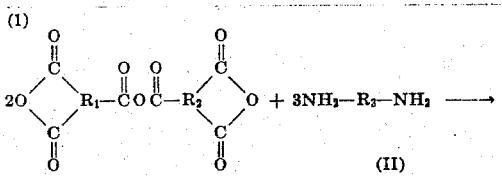

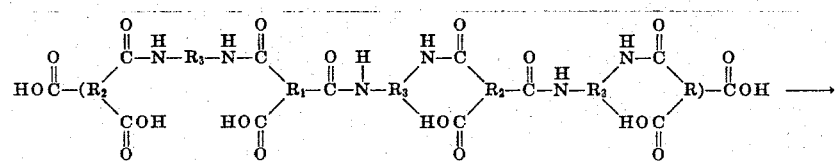

(Intermediate product)

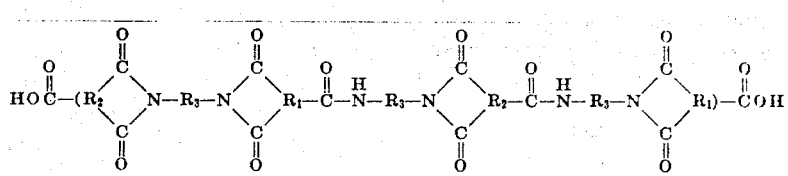

(2)

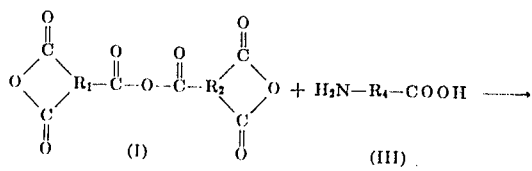

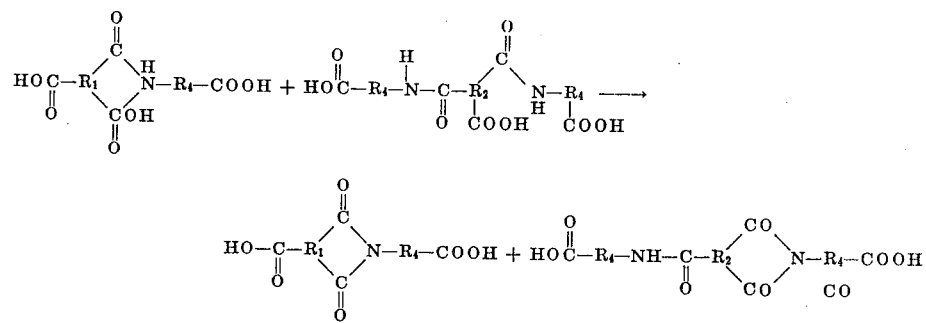

As described so far in the foregoing paragraphs, a single monomer or a plural number of monomers containing amino radicals can be in the present invention, or the monomers can be separately added into the reaction system or they can be mixed in advance, and the mixture can be added to the reaction system.

On the other hand, the above mentioned oligomers (1) and (2) are prepared separately, and then the oligomers can be added to the polymerization reaction in the second stage of the reaction of this invention.

In regard to the ratio of the monomers containing the amino radical, the equimol can be calculated respectively in accordance with the above described stoichiometric amount in accordance with the kinds and the ratio of the monomers, but it is not necessary to use the precise stoichiometrical amount if only more than 33 percent of the whole terminal radicals of the obtained oligomer be carboxyl radicals.

As is apparent from the reaction formulas given above, when the total amount of the monomer containing the amino radical is excessive, amino radical remains on the terminal of the oligomer, and when acid anhydride is excessive, acid anhydride radical remains as a terminal radical.

When an amino radical is present as an oligomer terminal radical, a urea bond is formed by the second stage of the reaction between the oligomer and the diisocyanate, and therefore undesirable characteristics are given to the physical properties of the final product even if high polymerization should be obtained.

On the other hand, in regard to the acid anhydride radical, when the linear anhydride bond of bis (tricarboxylic acid anhydride) anhydride is not reacted on the amino radical, and remains in the oligomer, an intermolecular bridging reaction is brought about by the reaction with diisocyanate, and undesirable results are brought about.

The effect obtained when acid anhydride remains on the terminal radical of the oligomer is relatively small, but when the amount of the remaining acid anhydride increases, the physical properties of the final product (in particular the folding modulus) are impaired.

The preferable monomer ratio is represented by the formula $$1 \leq (2n_1 + n_2/3m_1) \leq \frac{1}{3}$$

wherein $m_1$ is the number of mols of bis (tricarboxylic acid anhydride) anhydride (I) $n_1$ is the number of mols of primary diamine (II), and $n_2$ represents the number of mols of amino-carboxylic acid (III).

The reaction is carried out in an organic solvent at a temperature above 100°C, preferably at a temperature above 130°C but below 300°C.

The reaction can be carried out very smoothly and along with the progress of the reaction, or simultaneously, imidation is terminated.

The reaction may be carried out at a high temperature from its beginning, but is preferably carried out in two steps, i.e., first at a low temperature, and then at a high temperature.

Water is produced along with the progress of the reaction and should preferably be removed from the reaction system as quickly as possible in view of the following reaction of diisocyanate.

In the first stage reaction, a part of the bis (tricarboxylic acid anhydride) anhydride can be replaced with copolymerizable monomer, as a matter of course.

Typical examples of copolymerizable monomers are tricarboxylic acid anhydride, tetracarboxylic acid anhydride, etc., and the amount of the substitutable bis (tricarboxylic acid anhydride) anhydride is below 80 mol percent.

When the copolymerizable monomer is tricarboxylic anhydride and tetracarboxylic acid dianhydride, the amount of the copolymerizable monomer can be represented by the formula $$1 \geq (m_1/m_1 + m_2 + m_3) \geq 0.2$$

wherein $m_1$ is the same as defined above; $m_2$ is the number of mols of tricarboxylic acid anhydride and $m_3$ is the number of mols of tetracarboxylic acid dianhydride.

When the above mentioned copolymerizable monomers are used, the molar number of the respective monomers should be within the range specified by the formula $$\frac{1}{3} \leq \frac{2n_1 + n_2}{3m_1 + m_2 + 2m_3} \leq 1$$

wherein $m_1$, $m_2$, $m_3$, $n_1$ and $n_2$ are the same as defined above.

Tricarboxylic acid anhydride is represented by the formula

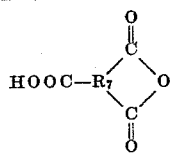

wherein $R_7$ has a structure as heretofore defined for $R_1$ and $R_2$.

Such tricarboxylic acid anhydrides as above identified include the following:
trimellitic acid anhydride,
2,3,6-naphthalene tricarboxylic acid anhydride,
2,3,5-naphthalene tricarboxylic acid anhydride,
2,2',3-biphenylcarboxylic acid anhydride,
2-(3,4-dicarboxyphenyl) 2-(3-carboxyphenyl) propane anhydride,
1,2,4-naphthalene tricarboxylic acid anhydride,
1,4,5-naphthalene tricarboxylic acid anhydride,
2,3,5-pyrazine tricarboxylic acid anhydride,
2-(2,3-dicarboxyphenyl)-2-(3-carboxyphenyl) propane anhydride,
1-(2,3-dicarboxyphenyl)-1-(3-carboxyphenyl) ethane anhydride,
1-(3,4-dicarboxyphenyl)-1-(4-carboxyphenyl) ethane anhydride,
(2,3-dicarboxyphenyl) (2-carboxyphenyl) methane anhydride,
1,2,3-benzenetricarboxylic acid anhydride,
3,3',4-tricarboxy benzophenone anhydride, etc.

Tetracarboxylic acid dianhydride is represented by the formula

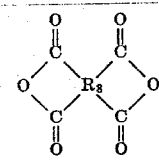

wherein $R_8$ is a tetravalent aliphatic, alicyclic or aromatic radical having from four to 25 carbon atoms, the aliphatic radicals being represented by the formula

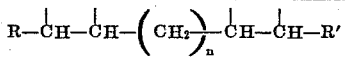

wherein R and R' are H or alkyl of one to 20 carbon atoms and n is zero to 18, the alicyclic radical being represented by the formulas

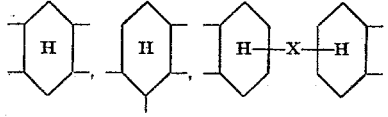

wherein X is nil,

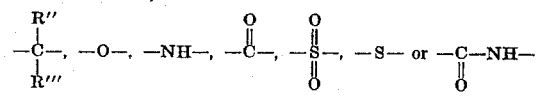

and the aromatic radical being represented by the formulae

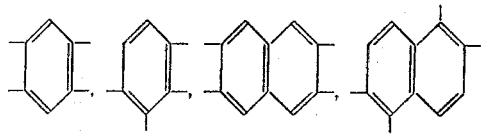

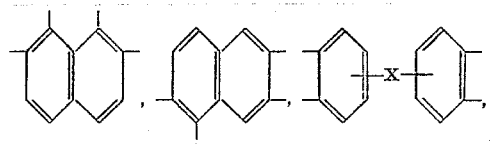

wherein X is as defined above.

Aromatic tetracarboxylic acid dianhydrides are preferable.

The above mentioned copolymerizable monomer can be added as the monomer of the oligomer producing reaction to the reaction system from the beginning of the reaction, or to the oligomer mixture obtained after the termination of the first stage reaction, and the mixture can be used in the second stage reaction with diisocyanate.

On the other hand, polyamines such as triamine, tetramine, etc., can also be used within such a range without departing from the spirit of the present invention.

The above mentioned polyamines can be aliphatic, alicyclic or aromatic triamines or tetramines, but in particular, aromatic polyamides are preferable.

In regard to the positions of the amino radicals of said polyamines, in the case of triamine, two amino radicals are bonded to the neighboring carbon atoms, and in the case of tetramine two pairs of two amino radicals are respectively bonded to the neighboring carbon atoms.

The amideimide oligomer composition thus obtained is reacted with diisocyanate in the second stage reaction, and the desired polyamideimide is produced.

The reaction is carried out in an organic solvent, but there is no special restriction on the restriction conditions. The reaction temperature is below 300° C, and preferably within the range from room temperature to 200° C. Generally speaking, the reaction is carried out at a temperature above 100° C for a sufficient time to attain a high degree of polymerization.

Diisocyanate is reacted on the terminal carboxyl and acid anhydride radicals of the above mentioned reaction product of the first stage to produce amido and imide bonds, and a polymer of high molecular weight can be obtained.

In the second stage reaction, it is preferable that the diisocyanate be used in such a manner that the isocyanate radical has a theoretically equimolar relation to the terminal radical of the oligomer composition, but more or less can be permitted.

On the other hand, it is possible to use a small amount of other polyisocyanate in carrying out the second stage reaction.

Along with the progress of the reaction, the viscosity of the solution is abruptly increased.

Carbon dioxide gas is generated simultaneously, and it is preferable to remove this carbon dioxide gas quickly.

The reaction with diisocyanate can be carried out continuously or intermittently, by removing the reaction product from the reaction solution.

On the other hand, ordinary solvents for polyamide can be used as the organic solvent, and there is no special restriction in this respect.

However, the solvent must not have a functional radical which might react on the above mentioned reaction product of the first stage, or diisocyanate.

It is preferable that the solvent have the ability to dissolve more than two types of raw materials.

On the other hand, the solvent to be used in the reaction is required to be a good solvent for the polymer, and it is not always necessary to confirm whether or not the solvent is an excellent one for the polymer.

Such organic solvents include the following: N,N'-dialkyl amides, such as dimethylacetamide, diethylacetamide, N-methyl-2-pyrrolidone, N-methylcaprolactam, dimethylformamide, dietherformamide, etc., but the following organic solvents can also be used: tetramethylurea, pyridine, dimethylsulfone, hexamethylphosphorylamide, tetramethylene sulfone, formamide, N-methylformamide, butyrolactone, N-acetyl-2-pyrrolidone, trimethylphosphite, etc.

The organic solvents listed above can be used independently or in the form of a mixture.

There is no difficulty at all when benzene, toluene, nitrobenzene, dioxane, cyclohexanone, trichlene, etc. are added to the aforementioned organic solvents.

On the other hand, it is possible to add inorganic salts, organic tertiary amines thereto in order to increase the solubility of the reaction product and to keep the reaction system uniform.

The following can be mentioned as examples of useful inorganic salts: lithium chloride, calcium chloride, magnesium carbonate, zinc chloride, etc.

It is possible to use small amounts of various kinds of materials which function as catalyst or promoter in the reaction.

As useful examples of such catalysts or promoters, the following are listed: tertiary amines such as pyridine, γ-picoline, quinoline, triethylamine, triethylene diamine, trimethylamine, N,N-dimethylamine, N-substituted morpholine, such as N-methylmorpholine, or N-ethylmorpholine.

Metal salts or heavy metal salts of weak acids such as cobalt acetate, cobalt naphthenate or alkali metal salt such as sodium oleate.

The polymer thus obtained can be confirmed to be polyamide-imide from the absorption of imido bond at $5.64\mu$ and $5.89\mu$ of infrared absorption spectrum, and the absorption of amide bond at $6.02\mu$.

As is apparent from the foregoing explanation, in accordance with the method of the present invention, a polyamideimide solution of high concentration and high polymerization can be obtained easily, and its processability is very easy, and the shaped articles obtained have high folding modulii. They are useful as film, fibers, insulating paints and the like.

It is not necessary to carry out the conventional secondary thermal treatment which mainly aims at the intermolecular cyclization but in order to obtain stronger shaped articles, it is preferable that the thermal treatment be carried out.

When the polymer obtained in accordance with the method of the present invention is used in the form of a solution, the polymer of this invention has excellent solubility in organic solvents even if it is cyclized, and it is therefore not necessary to carry out the two-step thermal treatment process from the standpoint of conventional methods, and thermal treatment can be carried out only for the purpose of removing the solvent.

However, it is recommended that the thermal treatment should not be carried out at once, but it should be carried out slowly or step by step.

The characteristics of the present invention reside in that bis (tricarboxylic acid anhydride) anhydride is used as a component of the monomer, and thereby it is possible to reduce the reaction temperature in the primary stage of the polymerization reaction, and by reason of the increase of the linearity shaped articles having excellent mechanical properties, in particular an excellent folding modulus, can be obtained.

The polymer obtained in accordance with the present invention has excellent properties of chemical resistance, adherability, solubility and processability, but as mentioned above, by controlling the ratio of amino radical containing monomers or other copolymerizable monomers or the method for polymerizing the same, the ratio of amide-imide or the alignment within the high polymers chain can be considerable freely controlled, and therefore it is possible to give various desired characteristics to the polymer finally obtained.

The following examples further illustrate the method of this invention. In the examples, logarithmic viscosity as is cited in the specification of this invention is defined by the following formula:

$$\eta_{inh} = \frac{\text{Natural logarithm} \frac{\text{Time required for the solution to flow down}}{\text{Time required for the solvent to flow down}}}{\text{Concentration}}$$

In the above formula, concentration stands for the concentration of the polymer in the solution, and is represented by the number of grams of the polymer per 100 ml of the solution.

Logarithmic viscosity in the following examples is the value obtained by using N-methylpyrrolidone at 20° C at a concentration of 0.5g/100 ml, unless otherwise specified.

EXAMPLE 1

76.84 parts of trimellitic acid anhydride and 400 parts of glacial acetic acid were heated in a flask provided with a reflux-condenser. After having refluxed for 3 hours, the excess of glacial acetic acid and the acetic acid produced were distilled out, and the reaction mixture was further heated at 150° C and bis (trimellitic acid anhydride) anhydride was obtained quantitatively.

82.26 parts of P-aminobenzoic acid and 530 parts of N-methylpyrrolidone were added thereto and the reaction mixture was heated at 185° C for 3 hours, and then 100.1 parts of diphenylmethane-4,4'-diisocyanate was added thereto, and polymerization was carried out at 170° C for 2 hours.

The logarithmic viscosity ($\eta$ inh) of the obtained polymer was 0.78.

The polymer solution thus obtained was coated on a copper wire whose diameter was 1 mm, and it was baked at a temperature ranging from 300° C to 350° C, and the coated copper wire thus obtained was stable when wound on its own diameter. Its abrasion resistance under a load of 700 g was from 270 to 300.

When the enameled wire thus obtained was boiled in 5 percent caustic soda aqueous solution for 30 minutes, there was no change in the film at all.

EXAMPLE 2

41.13 g of P-amino benzoic acid were dissolved into 400 parts of N-methylpyrrolidone, and 36.62 parts of bis (trimellitic acid anhydride) anhydride were added the form of solid into the resulting solution.

The reaction solution was stirred at room temperature for 1.5 hours, and then it was heated at 200° C, and the reaction solution was stirred for 2 hours while distilling out the reaction water.

50.05 parts of diphenylmethane-4,4'-diisocyanate were added in the form of solid, and vigorous decarboxylation was carried out.

The reaction was carried out at 200° C for 2 hours, and viscous polymer solution was obtained.

A part of the polymer solution thus obtained was poured on a glass plate and dried with hot air at 120° C for 15 minutes, and then it was thermally treated at 300° C for 20 minutes to produce film.

As a control polyamideimide to compare with the above obtained film, a polymer (A) was obtained from trimellitic acid anhydride and diphenyl methane-4,4'diisocyanate shaped into film in the same manner as before. The physical properties of the two films thus obtained are given in Table 1.

Tan δ (22° C, 1 Kc) = 0.0095

TABLE 1

| Physical Properties | Unit | Test method | Polymer obtained in accordance with the present invention | Polymer A |
|---|---|---|---|---|
| Folding endurance | times | JIS-P-8115 | 6,200 | 2,000 |
| Tenacity | kg/mm² | ASTM D822-64T | 17 | 13 |
| Elongation | % | ASTM D882-64T | 30 | 17 |
| Softening point | °C | Dynamic viscoelasticity test | 300 | 280 |
| Alkali resistance test | | boiling treatment in 10% caustic soda aqueous solution 30 min. | no change | soluble |

EXAMPLE 3

6,000 parts of 4,4'-diphenylether diamine and 7,324 parts of bis (trimellitic acid anhydride) anhydride were reacted in 20 parts of N-methylpyrrolidone at 15° C for 30 minutes by using the same device as in Example 1. Thereafter the temperature of the reaction system was raised to 180° C, and the reaction was carried out for 2½ hours while blow-nitrogen gas into the reaction system.

2,503 parts of diphenyl-methane-4,4'-diisocyanate and 5 parts of N-methylpyrrolidone were added into the reaction solution, and the polymerization was carried out at 190° C for 2 hours.

The logarithmic viscosity ($\eta$ inh) of the resulting polymer was 1.05.

The solution thus obtained was subjected to infrared spectrophotometry, and as a result, the absorption of amido radical and imido radical were recognized, but no carboxyl radical was observed.

The polymer solution was poured onto a glass plate, in a manner to prepare film, and it was thermally treated at 280° C for 10 minutes. The tenacity of the film thus obtained was 12 kg/mm² and its elongation was 17 percent.

The folding modulus of the film thus obtained was 3,300.

Tan δ (22° C, 1 Kc) = 0.0061

EXAMPLE 4

32.43 parts of m-phenylene diamine and 1.28 parts of bis (2,3,6-naphthalenetricarboxylic acid anhydride) anhydride were dissolved into 180 parts of dimethylacetamide as the solvent in the same manner as in Example 1, and the solution obtained was heated at 25° C for one hour and 170° C for 2½ hours, and the amount of water in the reaction system was 350 ppm.

17.42 parts of tolylene diisocyanate and 2.0 parts of triethyl amine were added thereto, and the polymerization was carried out at 170° C for 3 hours.

During the polymerization reaction the viscosity was increased, and the polymer solution stuck to the stirrer, and therefore 50 parts of dimethylacetamide was added thereto.

The logarithmic viscosity ($\eta$ inh) was 1.2 and on the other hand, the folding endurance of the film prepared on a glass plate in accordance with JIS P-8115 was 3,100.

Tan δ (22° C, 1 Kc) = 0.003

EXAMPLE 5

7.407 parts of P-aminobenzoic acid and 5.944 parts of 4,4'-diaminodiphenyl methane were dissolved into 100 parts of N-methylpyrrolidone by using the same device as in Example 1, and 21.937 parts of bis (trimellitic acid anhydride) anhydride was added in the form of solid into the solution, and the mixture was stirred at room temperature for one hour.

After having heated the reaction system at 185° C for 3 hours, 30,003 parts of diphenylmethane-4,4'-diisocyanate were added thereto, and the polymerization was carried out at 190° C for 2 hours. The logarithmic viscosity ($\delta$ inh) of the polymer obtained was 0.87.

The polymer solution obtained was coated on a copper wire whose diameter was 1 mm, and it was baked at a temperature ranging from 300° C to 350° C, and the enameled wire obtained was stable when wound upon its own diameter. Its abrasion resistance, under a load of 700 g, was from 265 to 290.

No change could be observed in the film when the enamel wire obtained was boiled in 5 percent caustic soda aqueous solution for 30 minutes.

As a control, the same tests were carried out on a polyamideimide obtained by reacting trimellitic acid anhydride and diphenylmethane-4,4'-diisocyanate. The abrasion resistance was 230 to 250, and the film was peeled off in 5 percent caustic soda aqueous solution.

EXAMPLE 6

In the same manner as in Example 5, 20.0 parts of 4,4'-diaminodiphenyl ether and 41.13 parts of m-aminobenzoic acid were dissolved into 250 parts of N-methylpyrrolidone, and thereafter 36.63 parts of bis (trimellitic acid anhydride) anhydride were added to the solution obtained. The reaction mixture was stirred at 190° C for 2 hours, and thereafter 25.22 parts of diphenylether-4,4'-diisocyanate were added, and the polymerization was carried out at 190° C for 3 hours. A viscous uniform polymer solution was obtained.

The logarithmic viscosity of the polymer obtained was 0.81 and the resulting polymer solution was coated on a glass plate and dried with hot air at 120° C for 15 minutes, and subjected to thermal treatment at 300° C for 20 minutes.

The folding modulus of the film thus obtained was 20,000 as a result of the test carried out in accordance with JIS-P-8115.

On the other hand, an equimolar amount of diphenylether-4,4'-diisocyanate was reacted with the reaction product obtained by reacting 4,4'-diaminodiphenylether and bis (trimellitic acid anhydride) anhydride at a molar ratio of 1.5:1 in the same manner as before, and polymer was obtained.

The logarithmic viscosity of the polymer thus obtained was 0.91.

Film was prepared from the polymer solution thus obtained, and its folding endurance was 12,000.

Tan δ (22° C, 1 Kc) = 0.0045

EXAMPLE 7

160 parts of N-methylpyrrolidone were charged into a flask provided with a reflux condenser, and 29.71 parts of 4,4'-diaminodiphenylmethane were dissolved into N-methylpyrrolidone, and then 36.62 parts of said bis (trimellitic acid anhydride) anhydride were added in solid form to the solution obtained.

The reaction mixture was stirred at room temperature for 1 hour, and then the temperature was raised up to 180° C, to carry out the reaction for another hour.

During the reaction period, nitrogen gas was passed through the reaction system, and the water produced was removed from the reaction system.

33.22 parts of 3,3',4,4'-benzophenone tetracarboxylic acid dianhydride and 50.050 parts of diphenylmethane-4,4'-diisocyanate were added thereto, and the reaction mixture was stirred at 190° C for 4 hours. Viscous polymer solution was obtained.

The logarithmic viscosity (δ inh) of the polymer solution thus obtained was 1.20.

A part of the polymer solution thus obtained was poured onto a glass plate, and when it was heated a tenacious film was obtained.

After having perfectly removed the solvent by heating the film thus obtained at 250° C to 300° C for 15 minutes, infrared absorption of imido bond was observed at 5.64μ and 5.89μ and the infrared absorption of amide bond was observed at 6.02μ.

The physical properties of the film thus obtained are as follows:
Folding endurance (MIT) = 12,000
Tenacity = 17.2 kg/mm²
Elongation = 30%
Dielectric loss — 0.002 (tan δ)
Thermal resistance = 175° C
(the temperature at which the MIT value becomes ½ of its original value after 20,000 hours)

EXAMPLES 8 – 15

The results of the polymerization carried out under the reaction conditions given in Table 2 and Table 3 in accordance with Example 6 are given in Table 3.

Films were prepared under the film forming conditions of Example 6, and the folding modulii of the resulting films were examined.

Each folding modulus was approximately from 19,000 to 24,000.

EXAMPLES 16 – 17

Polymers were prepared under the same polymerizing conditions as are shown in Tables 3 and 4 in accordance with the method of example 3, and each film was produced in accordance with the method of Example 7, and its physical properties were measured.

The results are given in the following table.

TABLE 2

| Example | Bis (tricarboxylic acid anhydride) | Aminocarboxylic acid | Copolymer component | Diamine | Diisocyanate | Solvent | Reaction temperature/reaction time | (η inh) |
|---|---|---|---|---|---|---|---|---|
| 8 | Bis (trimellitic acid anhydride) anhydride, 73.24 parts. | 4-amino-4'-carboxybiphenyl ketone, 14.47 parts. | Trimellitic acid, 10.5 parts. | 4,4'-diaminodiphenyl methane, 39.62 parts. | Diphenyl 4,4'-diisocyanate, 60.44 parts. | N-methyl pyrrolidone, 500 parts. | 190° C., 3 hrs. | 0.99 |
| 9 | Bis (2,3,5-pyrazinetricarboxylic acid anhydride) anhydride, 74.04 parts. | P-amino benzoic acid, 39.24 parts. | | m-Phenylene diamine, 21.6 parts. | Hexamethylene diisocyanate, 42.1 parts. | N-methyl pyrrolidone, 1 part. | 170° C., 3 hrs. | 0.88 |
| 10 | Bis (cyclopropane tricarboxylic acid anhydride) anhydride, 92.06 parts. | 4-amino-4'-carboxy diphenyl methane, 136.35 parts. | 3,3',4,4'-benzophenone tetracarboxylic acid dianhydride, 16.11 parts. | 4,4'-diamino diphenylether, 80.00 parts. | 4,4'-dimethoxy carbonyl diphenyl methane diamine, 157.02 parts. | N-methyl pyrrolidone, 1,200 parts. | 159° C., 6 hrs. | 0.42 |
| 11 | Bis (trimellitic acid anhydride) anhydride, 36.62 parts. | 1-amino-4'-cyclohexane carboxylic acid, 42.96 parts. | | p-Xylene diamine, 20.4 parts. | Diphenyl ether-4,4'-diisocyanate, 25.22 parts. | | 170° C., 5.5 hrs. | 0.61 |
| 12 | Bis (1,2,4-naphthalene tricarboxylic acid anhydride) anhydride, 162.8 parts. | 4-amino-4'-carboxydiphenyl sulfone, 166.38 parts. | Pyromellitic acid dianhydride, 7.2 parts. | Benzidine, 6.14 parts. | Phenylene-1,4-diisocyanate, 64.02 parts. | | 150° C., 3 hrs. | 1.03 |

TABLE 3

| Example | Bis (tricarboxylic acid anhydride) | Aminocarboxylic acid | Copolymer component | Diamine | Diisocyanate | Solvent | Reaction temperature/reaction time | (η inh) |
|---|---|---|---|---|---|---|---|---|
| 13 | Bis (2,3,5-pyridine tricarboxylic acid anhydride) anhydride, 73.64 parts. | m-Amino benzoic acid, 41.13 parts. | | Hexamethylene diamine, 29.05 parts. | Diphenylmethane-4,4'-diisocyanate, 37.5 parts. | N-methyl pyrrolidone, 49.0 parts. | 185° C., 2 hrs. | 1.04 |
| 14 | Bis (trimellitic acid anhydride) anhydride, 73.24 parts. | 1-amino-heptamethylene-5-carboxylic acid, 24.3 parts. | 3,3',4,4'-benzophenone tetracarboxylic acid dianhydride, 16.11 parts. | 4,4'-diamino diphenyl methane, 39.62 parts. | Cyclohexane-1,4-diisocyanate, 41.0 parts. | Dimethyl acetamide, 72.0 parts. | 160° C., 2.5 hrs. | 0.43 |
| 15 | Bis (trimellitic acid anhydride) anhydride, 146.48 parts. | 1-aminohexamethylene-6-carboxylic acid, 21.78 parts. | 3,3',4,4'-benzophenone tetracarboxylic acid dianhydride, 16.11 parts. | m-Phenylene diamine, 64.86 parts. | Tolylene-2,4-diisocyanate, 32.4 parts. | Hexamethyl phosphoramide, 150 parts. | 197° C., 3 hrs. | 0.67 |

TABLE 3 (EXAMPLES FROM 16 TO 19)

| Example | Bis(tricarboxylic acid anhydride)/anhydride | Diamine | Diisocyanate | Solvent | Temperature/time | Catalyst | (η inh) | Folding endurance | Elongation (percent) |
|---|---|---|---|---|---|---|---|---|---|
| 16 | Bis(2,3,5-pyridine tricarboxylic acid anhydride)anhydride, 73.64 parts. | 4,4'-diaminodiphenyl ether, 60.07 parts. | Phenylene (1, 3) diisocyanate, 16.01 parts. | Dimethyl acetamide, 200 parts. | (1) (10° C./1.5 hr.) (2) (150° C./2hr.) | Cobalt naphthenate, 8.0 parts. | 1.23 | 3,300 | 17.8 |
| 17 | Bis(trimellitic acid anhydride)anhydride, 146.48 parts. | Diphenyl methane 4,4'-diamine, 150.2 parts. | Tetramethylene (1,4)-diisocyanate, 28.03 parts. | N-methyl pyrrolidone, 400 parts. | (1) (17° C./1 hr.) (2) (180° C./2 hr.) | Quinoline, 7.2 parts. | 1.18 | 3,180 | 16.8 |
| 18 | Bis(cyclopropane tricarboxylic acid anhydride) anhydride, 46.03 parts. | 3,3'-dichlorobenzidine, 75.58 parts. | Hexamethylene (1, 6)-diisocyanate, 16.82 parts. | Diethyl acetamide, 250 parts. | (1) (35° C./1 hr.) (2) (170° C./2 hr.) | Triethylene diamine, 5.0 parts. | 1.31 | 3,380 | 17.9 |
| 19 | Bis(trimellitic acid anhydride) anhydride, 73.24 parts. | Dicyclohexyl methane-4,4'-diamine, 61.89 parts. | Dicyclohexyl methane-4,4'-diisocyanate, 25.83 parts. | Hexamethyl phosphor amide, 300 parts. | (1) (30° C./1.5 hr.) (2) (160° C./3 hr.) (2) (180°C./2 hr.) | None | 1.35 | 3,400 | 18.1 |

REMARKS:
(1) is the reaction condition of the reaction between bis(tricarboxylic acid anhydride) anhydride.
(2) is the reaction condition of the reaction between the reaction product of (1) and diisocyanate.

TABLE 3(2)

| Example | Bis(tricarboxylic acid anhydride) anhydride | Aminocarboxylic acid | Copolymer component | Diisocyanate | Solvent | Reaction temperature/reaction time | (η inh) |
|---|---|---|---|---|---|---|---|
| 20 | Bis(3,3',4-tricarboxy benzo phenone anhydride) anhydride, 114.8 parts. | P-aminobenzoic acid, 41.13 parts. | None | Diphenylether-4,4'-diisocyanate, 50.44 parts. | N-methylpyrrolidone, 290 parts. | 175° C., 3 hrs. | 1.24 |
| 21 | Bis(trimellitic acid anhydride) anhydride, 36.62 parts. | 1-amino-4-cyclohexane carboxylic acid, 42.96 parts. | Trimellitic acid anhydride, 9.6 parts. | Tolylene-2,4-diisocyanate, 43.53 parts. | Hexamethyl phosphoramide, 150 parts. | 177° C., 3 hrs. | 0.49 |
| 22 | Bis(1,2,4-naphthalene tricarboxylic acid anhdride) anhydride, 102.8 parts. | 4-amino-4'-carboxybiphenyl sulfone, 166.38 parts. | Pyromellitic acid dianhydride, 7.2 parts. | Phenylene-1,4-diisocyanate, 69.33 parts. | N-methylcaprolactam, 700 parts. | 150° C., 3 hrs. | 1.03 |

TABLE 4

| Example | Bis(tricarboxylic acid anhydride) anhydride | Diamine | Polycarboxylic acid | Diisocyanate | Solvent | Temperature-time | Catalyst | (η inh) | Folding endurance | Dielectric loss |
|---|---|---|---|---|---|---|---|---|---|---|
| 23 | Bis(2,3-5-pyridine tricarboxylic acid anhydride) anhydride, 73.64 parts. | 4,4'-diamino diphenyl ether, 40.04 parts. | 3,3',4,4'-benziphenonetetracarboxylic acid dianhydride, 32.22 parts. | Phenylene (1,3)-diisocyanate, 48.03 parts. | Dimethyl acetamide, 200 parts. | (1) (10° C./1.5 hr.) (2) (166° C./2 hr.) | Cobalt naphthenate, 8.0 parts | 1.44 | 3,300 | 0.004 |
| 24 | Bis(trimellitic acid anhydride) anhydride, 146.48 parts. | Diphenylmethane-4,4'-diamine, 200.4 parts. | Pyromellitic acid dianhydride, 21.84 parts. | Tetramethylene (1,4)-diisocyanate, 28.03 parts. | N-methylpyrrolidone, 400 parts. | (1) (19° C./2 hr.) (2) (190° C./.015 hr.) | Quinoline, 7.2 parts | 1.08 | 3,180 | |
| 25 | Bis(cyclopropane tricarboxylic acid anhydride) anhydride, 23.02 parts. | 3,3'-dichlorobenzidine, 37.8 parts. | Naphthalene tetracarboxylic acid dianhydride, 18.4 parts. | Hexamethylene (1,6)-diisocyanate, 16.82 parts. | Dimethyl acetamide, 150 parts. | (1) (25° C./1.5 hr.) (2) (160° C./0.5 hr.) | Triethylene diamine, 6.0 parts. | 0.82 | 3,800 | 0.002 |
| 26 | Bis(trimellitic acid anhydride) anhydride, 73.24 parts. | Dichclohexyl methane 4,4'-diamine, 61.89 parts. | Bis (2,3-dicarboxy phenyl) methane dianhydride, 30.8 parts. | Dicyclohexyl methane 4,4'-diisocyanate, 51.66 parts. | Hexamethyl phosphor amide, 500 parts. | (1) (20° C./0.5 hr.) (2) (190° C./3 hr.) | None | 1.20 | 4,400 | 0.0022 |
| 27 | Bis(1,2,4-naphthalene tricarboxylic acid anhydride) anhydride, 5.14 parts. | Ethylene diamine, 9.03 parts. | 3,3',4,4'-benzophenone tetracarboxylic acid dianhydride, 3.22 parts. | Toluylene (2,6) diisocyanate, 17.42 parts. | N-methylcaprolactam, 100 parts. | (1) (30° C./1 hr.) (2) (165° C./2.5 hr.) | do | 1.33 | 6,200 | 0.003 |

REMARKS:
(1) is the reaction condition of the reaction between bis(tricarboxylic acid anhydride) anhydride.
(2) is the reaction condition of the reaction between the reaction product of (1) and diisocyanate.

The following is claimed:
1. The method of manufacturing a polyamideimide comprising the steps of
A. providing an amideimide oligomer composition by reacting
   1. a bis (tricarboxylic anhydride) anhydride of the formula

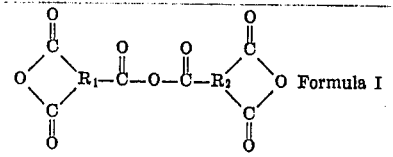  Formula I wherein $R_1$ and $R_2$ are selected from the group consisting of
   1. trivalent aliphatic radicals represented by the formula:

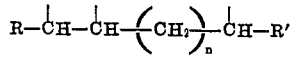

wherein R and R' represent H or an alkyl group having one to 20 carbon atoms and $n$ is zero to 10,
   2. trivalent alicyclic radicals represented by the formula:

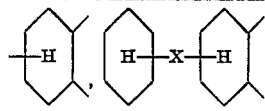

wherein X is selected from the group consisting of a carbon to carbon bond (nil),

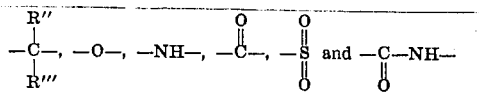

where R'' and R''' represent H or alkyl group having one to 10 carbon atoms, and
   3. a trivalent aromatic radical selected from the group consisting of

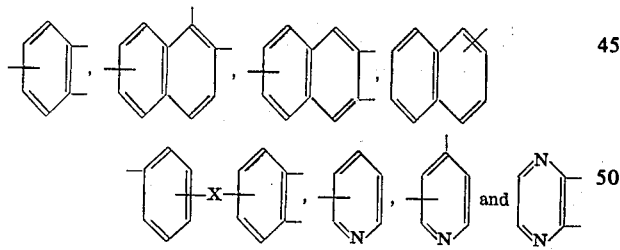

wherein X is the same as defined above,
   2. with a compound selected from the group consisting of the compounds of the formula

   Formula II

   Formula III wherein $R_3$ is a member selected from the group consisting of
   1. a divalent aliphatic radical represented by the formula:

and its derivatives in which one to five hydrogen atoms in $-(CH_2)_n-$ are substituted by an alkyl group of one to 10 carbon atoms, an alkoxy group of one to 10 carbon atoms and chlorine, wherein $n$ is two to 15,
   2. a divalent alicyclic radical represented by the formula:

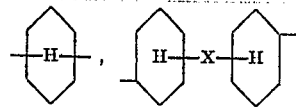

wherein X is the same as defined above and
   3. a divalent aromatic radical represented by the formula:

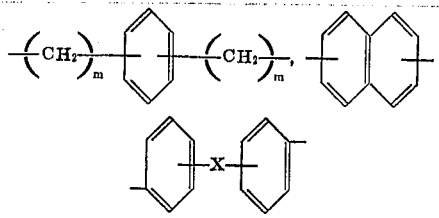

and
derivatives thereof in which one to four hydrogen atoms in the benzene nucleus or nuclei are substituted by alkyl of one to 10 carbon atoms, alkoxy of one to 10 carbon atoms and chlorine, wherein $m$ is 0 or 1, and X is the same as defined above,
and $R_4$ is a member selected from the group consisting of
   1. a divalent aliphatic radical represented by the formula:

wherein $n$ is 3 to less than 10
   2. a divalent alicyclic radical represented by the formula:

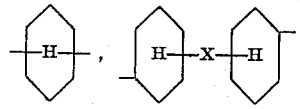

wherein X is the same as defined above and
   3. a divalent aromatic radical represented by the formula:

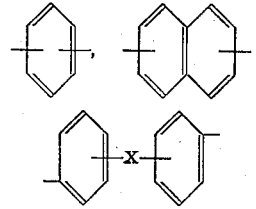

wherein X is the same as defined above, and the amino radical and the carboxyl radical are bonded to separate carbon atoms, and the amino radical and the carboxyl radical are not bonded on neighboring positions, wherein the compounds represented by the general formula I, II and III are reacted in a molar ratio within the range represented by the formula ⅓ $(2n_1 + n_2/3m_1)$ 1
wherein $m_1$ is the number of mols of bis (tricarboxylic acid anhydride) anhydride represented by Formula I; $n_1$ is the number of mols of the primary diamine represented by Formula II and $n_2$ is the number of mols of aminocarboxylic acid represented by Formula III whereby the terminal of said amineimide oligomer has terminal radicals selected from the group consisting of carboxyl and acid anhydride radicals B. reacting said amideimide oligomer in an inert organic solvent at a temperature of about room temperature to about 300°C with a substantially equimolar quantity of a diisocyanate based on the isocyanate radical and the terminal radical of the oligomer composition of the formula $$OCN - R_5 - NCO$$

wherein $R_5$ is a member selected from the group consisting of $)_n-$
1. divalent aliphatic radicals represented by the formula:

and its derivatives in which one to 10 hydrogen atoms in $(CH_2)_n$ are substituted by alkyl of one to 10 carbon atoms, alkoxy of one to 10 carbon atoms and chlorine, wherein $n$ is three to 15, 2. a divalent alicyclic radical represented by the formula:

wherein X is the same as defined above and
3. a divalent aromatic radical represented by the formula:

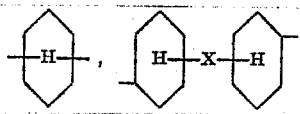

and and derivatives thereof in which one to four hydrogen atoms in the benzene nucleus or nuclei are substituted by an alkyl group of one to 10 carbon atoms, an alkoxy group of one to 10 carbon atoms or chlorine, wherein m is 0 or 1, and X is the same as defined above, whereby said polyamideimide is obtained.

2. The polyamideimide obtained by the process of claim 1.

3. Method according to claim 1, wherein less than 80 mol percent of bis (tricarboxylic acid anhydride) anhydride is substituted by at least one compound selected from the following groups:

(a)
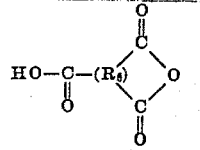

wherein $R_6$ is a trivalent organic radical having from three to 25 carbon atoms, and two of the three carbonyl radicals bonded to $R_6$ are bonded on the neighboring positions, and (b) a tetracarboxylic acid dianhydride represented by the structural formula

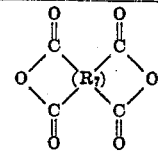

wherein $R_7$ is a tetravalent organic radical having from four to 25 carbon atoms, and two of the four carbonyl radicals bonded to $R_7$ are bonded on the neighboring positions.

4. Method for producing a polyamideimide according to claim 3 wherein the amount of each monomer is within the range specified by the formula $$\frac{1}{3} \leq \frac{2n_1+n_2}{3m_1+m_2+2m_3} \leq 1$$

wherein $m_1$ is the number of mols of bis (tricarboxylic acid anhydride) anhydride; $m_2$ is the number of mols of tetracarboxylic acid dianhydride; $m_3$ is the number of mols of tetracarboxylic acid dianhydride; $n_1$ is the number of mols of diamine; and $n_2$ is the number of mols of aminocarboxylic acid.

5. Method for producing polyamideimide according to claim 1, wherein a diisocyanate derivative modified by reaction with $R_6OH$ is used in place of diisocyanate, and wherein $R_6$ represents an alkyl radical of one to 10 carbon atoms, a cycloalkyl radical of three to 10 carbon atoms or an aryl radical of six to 22 carbon atoms.

6. Method according to claim 1, wherein said amino compound is used within the range of at least 5 mol percent of formula [II] defined in claim 1 and correspondingly at most 95 mol percent of formula [III] defined in claim 1.

* * * * *